United States Patent
Huang et al.

(10) Patent No.: US 10,573,323 B2
(45) Date of Patent: Feb. 25, 2020

(54) SPEAKER RECOGNITION BASED ON VIBRATION SIGNALS

(71) Applicant: Intel Corporation, Santa Clara, CA (US)

(72) Inventors: Jonathan Huang, Pleasanton, CA (US); Hector Cordourier Maruri, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 15/854,028

(22) Filed: Dec. 26, 2017

(65) Prior Publication Data

US 2019/0043512 A1    Feb. 7, 2019

(51) Int. Cl.
*G10L 17/22*    (2013.01)
*G10L 17/06*    (2013.01)
*G10L 17/26*    (2013.01)
*G10L 25/84*    (2013.01)
*G10L 17/12*    (2013.01)

(52) U.S. Cl.
CPC .............. *G10L 17/22* (2013.01); *G10L 17/06* (2013.01); *G10L 17/26* (2013.01); *G10L 17/12* (2013.01); *G10L 25/84* (2013.01)

(58) Field of Classification Search
USPC .......................................................... 704/233
See application file for complete search history.

(56) References Cited

U.S. PATENT DOCUMENTS

| | | | |
|---|---|---|---|
| 5,191,237 A * | 3/1993 | Takebe | G01L 1/18 257/254 |
| 9,620,116 B2 * | 4/2017 | Dadu | G10L 15/20 |
| 10,390,163 B2 * | 8/2019 | Norris | H04M 3/53366 |
| 2012/0224456 A1 * | 9/2012 | Visser | G01S 3/8006 367/127 |
| 2012/0284022 A1 * | 11/2012 | Konchitsky | G10L 15/24 704/231 |
| 2013/0285172 A1 * | 10/2013 | Jeong | G01C 19/574 257/415 |
| 2014/0029762 A1 * | 1/2014 | Xie | H04R 5/027 381/94.1 |
| 2014/0149117 A1 * | 5/2014 | Bakish | G10L 15/24 704/248 |
| 2015/0104044 A1 * | 4/2015 | Lee | H04R 1/08 381/120 |
| 2015/0201054 A1 * | 7/2015 | Gainsboro | H04M 3/2281 704/201 |
| 2015/0356981 A1 * | 12/2015 | Johnson | G10L 15/26 704/231 |

(Continued)

OTHER PUBLICATIONS

Huan Feng et al., "Continuous Authentication for Voice Assistants", MobiCom '17, Oct. 16-20, 2017, Snowbird, UT, USA, 13 pages.

(Continued)

*Primary Examiner* — Thuykhanh Le
(74) *Attorney, Agent, or Firm* — Green, Howard & Mughal LLP.

(57) ABSTRACT

An embodiment of a semiconductor package apparatus may include technology to acquire vibration information corresponding to a speaker, and identify the speaker based on the vibration information. Other embodiments are disclosed and claimed.

17 Claims, 10 Drawing Sheets

(56) References Cited

U.S. PATENT DOCUMENTS

| | | | |
|---|---|---|---|
| 2015/0370320 A1* | 12/2015 | Connor | A61B 5/6831 |
| | | | 345/173 |
| 2015/0373477 A1* | 12/2015 | Norris | H04R 5/04 |
| | | | 381/303 |
| 2016/0011063 A1* | 1/2016 | Zhang | G01L 1/18 |
| | | | 600/301 |
| 2016/0142816 A1 | 5/2016 | Weast et al. | |
| 2017/0078788 A1 | 3/2017 | Lopez Meyer et al. | |
| 2017/0116995 A1* | 4/2017 | Ady | G10L 17/24 |
| 2017/0136969 A1* | 5/2017 | Drescher | B60R 16/0373 |
| 2017/0256181 A1* | 9/2017 | Chen | G09B 21/003 |
| 2017/0351848 A1* | 12/2017 | Bakish | G06F 21/83 |

OTHER PUBLICATIONS

Cordourier Maruri et al., U.S. Appl. No. 15/273,449, entitled "Audio Signal Emulation Method and Apparatus", filed Sep. 22, 2016, 30 pages.

\* cited by examiner

SPEAKER RECOGNITION BASED ON VIBRATION SIGNALS

TECHNICAL FIELD

Embodiments generally relate to speaker recognition systems. More particularly, embodiments relate to speaker recognition based on vibration signals.

BACKGROUND

A system may include technology to identify a user of the system. On some computer devices, a password or personal identification number (PIN) may be entered by a keyboard (e.g., physical or virtual). Some devices may utilize biometric features (e.g., fingerprints, retinal images, etc.) to identify the user. Speech recognition may refer to the recognition of spoken words by a computing device, while voice recognition or speaker recognition may refer to identifying the speaker of the spoken words as opposed to what the speaker said.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
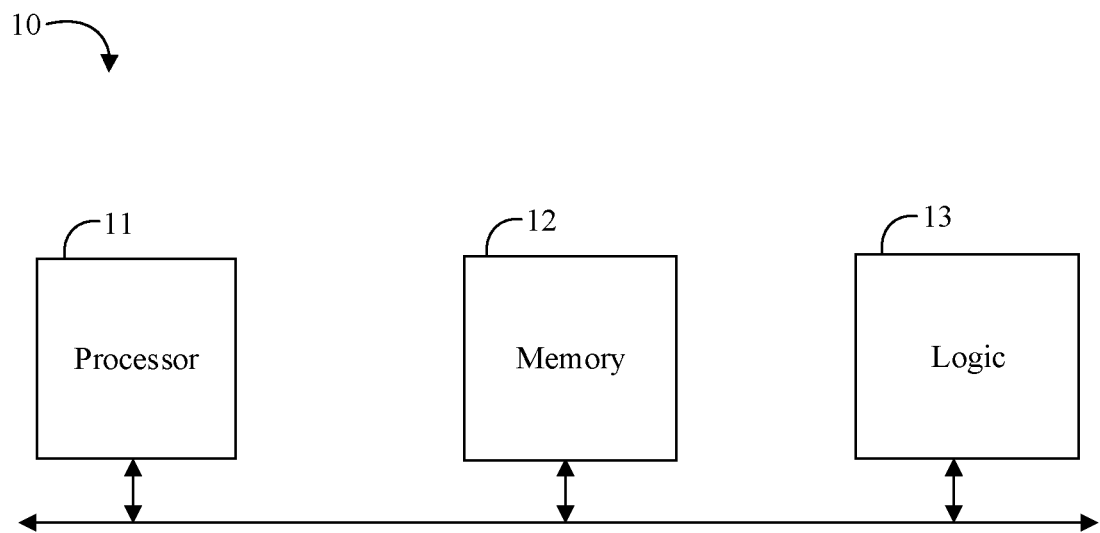
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to acquire vibration information corresponding to a speaker, and identify the speaker based on the vibration information. In some embodiments, the logic 13 may be further configured to acquire audio information corresponding to the speaker, and identify the speaker based on both the audio information and the vibration information. For example, the logic 13 may be configured to perform speaker recognition based on the audio information to determine a first recognition score, perform speaker recognition based on the vibration information to determine a second recognition score, and identify the speaker based on an average of the first recognition score and the second recognition score. Some embodiments of the system 10 may utilize a background noise threshold. For example, the logic 13 may be further configured to determine a level of background noise, compare the level of background noise against a threshold, identify the speaker based on both the audio information and the vibration information if the level of background noise is less than the threshold, and identify the speaker based on only the vibration information if the level of background noise is greater than or equal to the threshold. Some embodiments of the system 10 may utilize a weighted average based on the level of background noise. For example, the logic 13 may alternatively, or additionally, be configured to determine a level of background noise, apply weights to the first and second recognition scores based on the level of background noise, and identify the speaker based on an average of the weighted first recognition score and the weighted second recognition score. In some embodiments, the logic 13 may be configured to acquire the audio information from a microphone, and/or to acquire vibration information from an accelerometer. For example, the vibration information may correspond to one or more of a nasal vibration, a facial vibration, a forehead vibration, a temple vibration, a throat vibration and a neck vibration.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, acquiring audio information corresponding to a speaker, acquiring vibration information corresponding to the speaker, identifying the speaker based on both the audio information and the vibration information, etc.).

Figure 2:
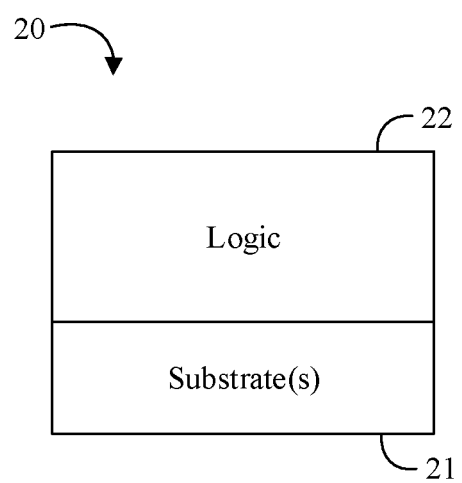
FIG. 2 is a block diagram of an example of a semiconductor package apparatus according to an embodiment.
Figure 3A:
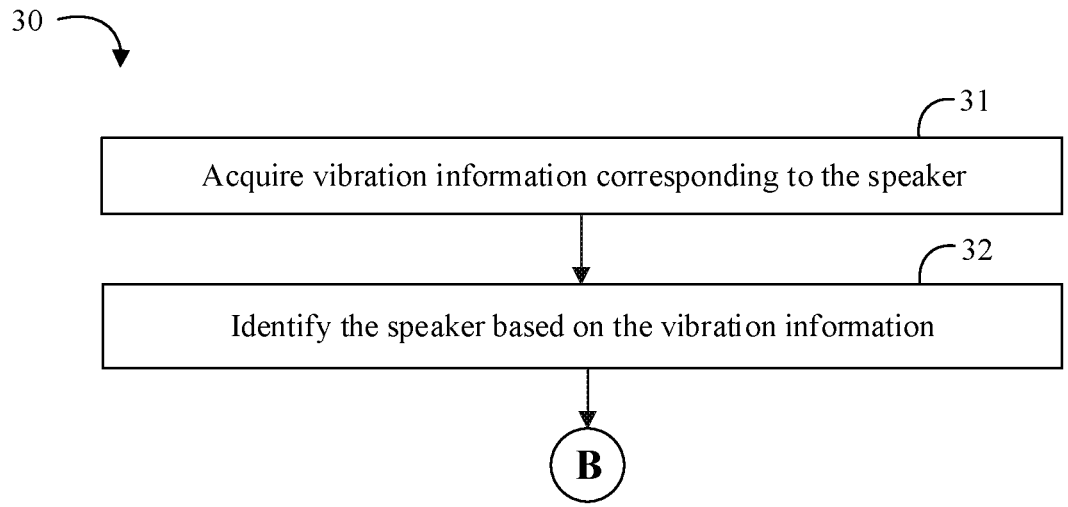
FIGS. 3A to 3D are flowcharts of an example of a method of identifying a speaker according to an embodiment.
Figure 3B:
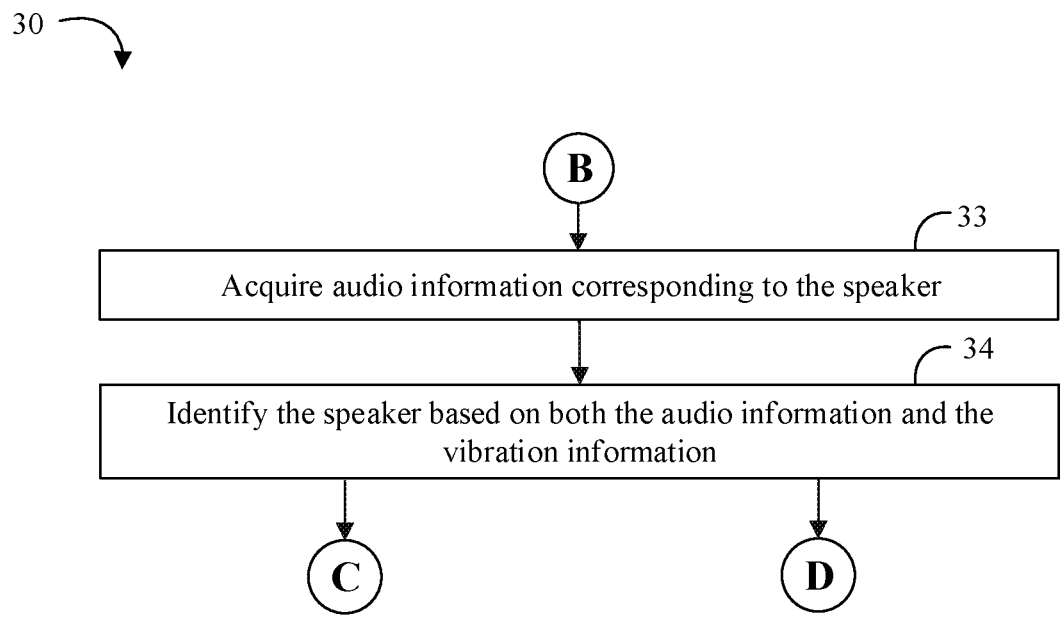
Figure 3C:
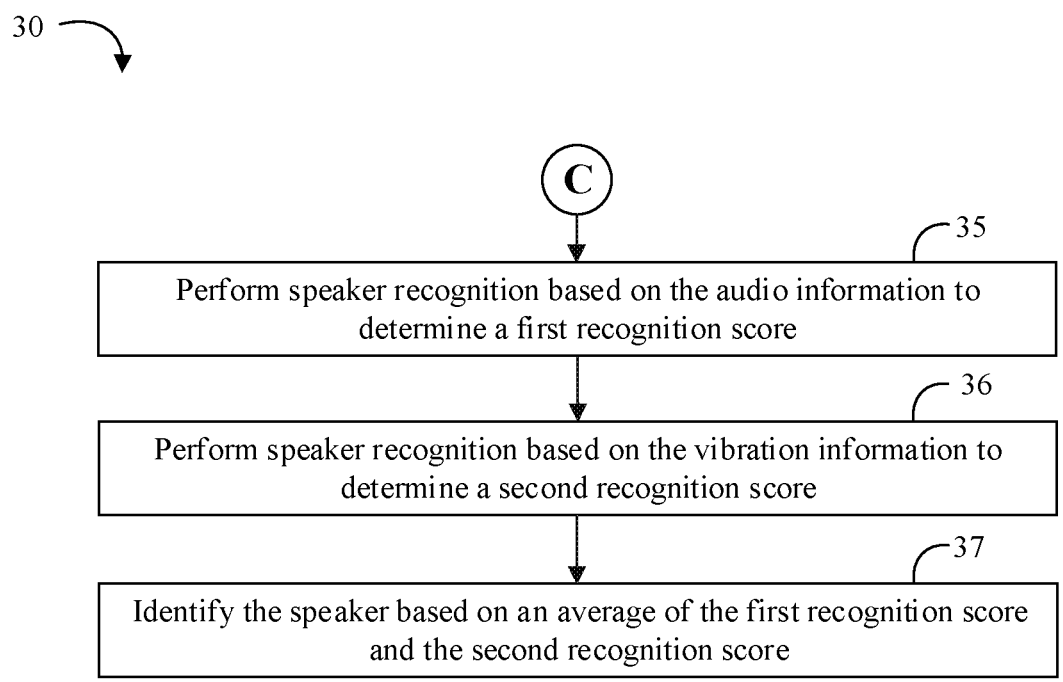
Figure 3D:
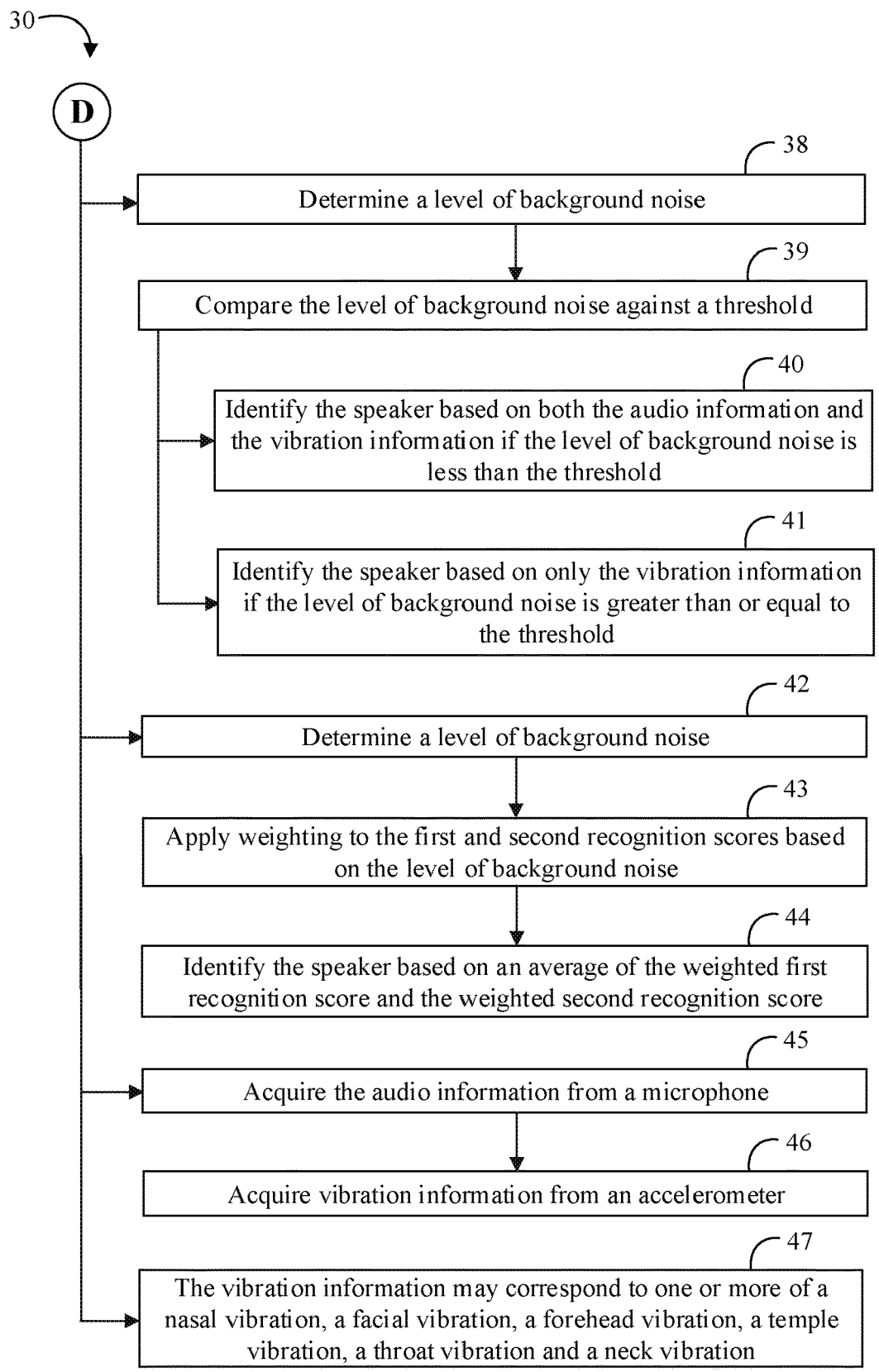

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to acquire vibration information corresponding to a speaker, and identify the speaker based on the vibration information. In some embodiments, the logic 22 may be further configured to acquire audio information corresponding to the speaker, and identify the speaker based on both the audio information and the vibration information. For example, the logic 22 may be configured to perform speaker recognition based on the audio information to determine a first recognition score, perform speaker recognition based on the vibration information to determine a second recognition score, and identify the speaker based on an average of the first recognition score and the second recognition score. Some embodiments of the apparatus 20 may utilize a background noise threshold. For example, the logic 22 may be further configured to determine a level of background noise, compare the level of background noise against a threshold, identify the speaker based on both the audio information and the vibration information if the level of background noise is less than the threshold, and identify the speaker based on only the vibration information if the level of background noise is greater than or equal to the threshold. Some embodiments of the apparatus 20 may utilize a weighted average based on the level of background noise. For example, the logic 22 may alternatively, or additionally, be configured to determine a level of background noise, apply weights to the first and second recognition scores based on the level of background noise, and identify the speaker based on an average of the weighted first recognition score and the weighted second recognition score. In some embodiments, the logic 22 may be configured to acquire the audio information from a microphone, and/or to acquire vibration information from an accelerometer. For example, the vibration information may correspond to one or more of a nasal vibration, a facial vibration, a forehead vibration, a temple vibration, a throat vibration and a neck vibration. In some embodiments, the logic 22 coupled to the one or more substrates 21 may include transistor channel regions that are positioned within the one or more substrates.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 20 may implement one or more aspects of the method 30 (FIGS. 3A to 3D), the process flow 59 (FIGS. 6A to 6B), the process flow 70 (FIG. 7), and/or the process flow 80 (FIG. 9), discussed below. The illustrated apparatus 20 includes one or more substrates 21 (e.g., silicon, sapphire, gallium arsenide) and logic 22 (e.g., transistor array and other integrated circuit/IC components) coupled to the substrate(s) 21. The logic 22 may be implemented at least partly in configurable logic or fixed-functionality logic hardware. In one example, the logic 22 includes transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Turning now to FIGS. 3A to 3D, an embodiment of a method 30 of identifying a speaker may include acquiring vibration information corresponding to the speaker at block 31, and identifying the speaker based on the vibration information at block 32. Some embodiments of the method 30 may further include acquiring audio information corresponding to the speaker at block 33, and identifying the speaker based on both the audio information and the vibration information at block 34. For example, the method 30 may also include performing speaker recognition based on the audio information to determine a first recognition score at block 35, performing speaker recognition based on the vibration information to determine a second recognition score at block 36, and identifying the speaker based on an average of the first recognition score and the second recognition score at block 37. Some embodiments of the method may further include determining a level of background noise at block 38, comparing the level of background noise against a threshold at block 39, identifying the speaker based on both the audio information and the vibration information if the level of background noise is less than the threshold at block 40, and identifying the speaker based on only the vibration information if the level of background noise is greater than or equal to the threshold at block 41.

Alternatively, or additionally, some embodiments of the method 30 may include determining a level of background noise at block 42, applying weighting to the first and second recognition scores based on the level of background noise at block 43, and identifying the speaker based on an average of the weighted first recognition score and the weighted second recognition score at block 44. For example, the method 30 may include acquiring the audio information from a microphone at block 45, and acquiring vibration information from an accelerometer at block 46. In any of the embodiments herein, the vibration information may correspond to one or more of a nasal vibration, a facial vibration, a forehead vibration, a temple vibration, a throat vibration and a neck vibration at block 47.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS).

Figure 4:
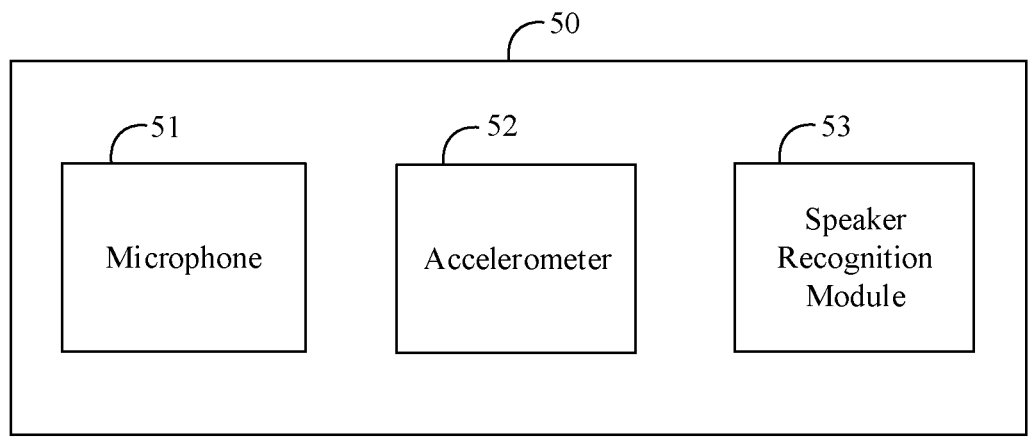
FIG. 4 is a block diagram of an example of wearable apparatus according to an embodiment.

Turning now to FIG. 4, an embodiment of a wearable apparatus 50 may include a microphone 51, an accelerometer 52, and a speaker recognition module 53. For example, the wearable apparatus 50 may have any suitable form factor such as a headset, a headband, a hat, a cap, a headset, eyeglasses, etc. The microphone 51 may be positioned on the wearable apparatus to capture audible speech sounds from a speaker wearing the wearable apparatus 50. Audio information from the microphone may include digital representations of the audible speech sounds. The accelerometer 52 may be positioned on the wearable apparatus to be proximate to or against the skin of the speaker to capture vibrations from bone and/or tissue conduction simultaneously with the microphone. Vibration information from the accelerometer may include digital representations of non-audible vibrations corresponding to the speaker when the speaker produces the audible speech sounds. For example, the vibration information may correspond to one or more of a nasal vibration, a facial vibration, a forehead vibration, a temple vibration, a throat vibration and a neck vibration. The speaker recognition module 53 may include technology to acquire the audio information corresponding to the speaker from the microphone 51, to acquire the vibration information corresponding to the speaker from the accelerometer 52, and to identify the speaker based on both the audio information and the vibration information.

In some embodiments, the speaker recognition module 53 may be configured to perform speaker recognition based on the audio information to determine a first recognition score, perform speaker recognition based on the vibration information to determine a second recognition score, and identify the speaker based on an average of the first recognition score and the second recognition score. Some embodiments of the apparatus 50 may utilize a background noise threshold. For example, the speaker recognition module 53 may be further configured to determine a level of background noise (e.g., utilizing the microphone 51), compare the level of background noise against a threshold, identify the speaker based on both the audio information and the vibration information if the level of background noise is less than the threshold, and identify the speaker based on only the vibration information if the level of background noise is greater than or equal to the threshold. Some embodiments of the apparatus 50 may utilize a weighted average based on the level of background noise. For example, the speaker recognition module 53 may alternatively, or additionally, be configured to determine a level of background noise, apply weights to the first and second recognition scores based on the level of background noise, and identify the speaker based on an average of the weighted first recognition score and the weighted second recognition score. In some embodiments, all or portions of the speaker recognition module 53 may be implemented on a user device which is communicatively coupled to the wearable apparatus 50 (e.g., wired or wirelessly), such that the microphone and/or accelerometer related information may be acquired indirectly (e.g., through an antenna and radio communication). For example, the user device may include a smartphone, a tablet, a laptop computer, a notebook computer, or another portable computing device. In some embodiments, all or portions of the speaker recognition module 53 may be implemented on a server which is communicatively coupled to the wearable apparatus 50 (e.g., wired or wirelessly). For example, the microphone and/or accelerometer related information may be uploaded to the cloud to perform the speaker recognition based on the microphone and/or accelerometer information.

Embodiments of the microphone 51, the accelerometer 52, the speaker recognition module 53, and other components of the wearable apparatus 50, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Some embodiments may advantageously provide speaker recognition technology utilizing vibration sensing wearable devices such as glasses. Some embodiments may provide improved technology for speaker recognition (SR), also referred to as voice metrics, which may incorporate speech signals acquired by nasal vibration signals. Passwords and PINs may sometimes be cumbersome for users (e.g., especially in wearable devices) and may be ineffective if the keyword is stolen or if the interface to enter the password/PIN is not conveniently available (e.g., for wearable devices such as smart glasses, smart watches, a headset, etc.). Dedicated hardware for biometric feature detection may be expensive, and may increase the cost for small, wearable devices. Despite some progress, audio-only based speaker recognition technology may have problems involving recognition accuracy that may fall short of other modes of biometric authentication, vulnerability to replay attack (e.g., playback of a user's speech using a good quality loudspeaker to enter the system), and/or performance that degrades in the presence of noise. Some embodiments may advantageously overcome one or more of the foregoing problems with user identification with technology to acquire simultaneous recordings of speech by a microphone and an accelerometer, and technology to recognize the speaker using both the microphone and the accelerometer information. For example, when a background noise level is low, performing parallel speaker recognition on both an audio data stream and a vibration data stream and averaging the two recognition scores may advantageously provide improved error rates as compared to utilizing either data stream alone. Under noisy conditions the speech data from the microphone may deteriorate. Some embodiments may selectively utilize only the recognition score of the accelerometer stream under noisy conditions. For a wearable device, some embodiments may advantageously provide less cumbersome technology to accurately identify and/or authenticate the person wearing the device.

Figure 5:
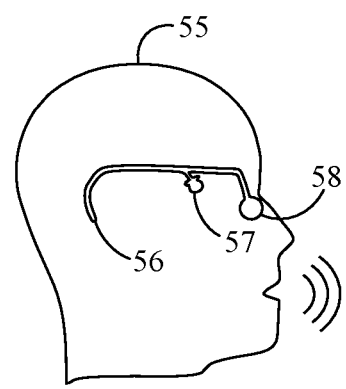
FIG. 5 is an illustrative diagram of a speaker wearing a wearable device according to an embodiment.

Turning now to FIG. 5, a speaker 55 may be wearing an embodiment of a wearable device 56 which includes both a microphone 57 and an accelerometer 58. The microphone 57 may be positioned on the wearable device 56 to detect audible speech sounds from the speaker 55, while the accelerometer 58 may be positioned on the wearable device 56 to simultaneously detect non-audible nasal vibrations from the speaker 55. For example, the accelerometer 58 may be positioned near the speaker's nose. In some embodiments, the wearable device 56 may be in the form factor of a headset where the accelerometer 58 may be supported by an extension of the headset that goes either above the eye (e.g., as shown) or under the eye across the cheek of the speaker 55. In other embodiments, the wearable device 56 may have other form factors such as glasses where the accelerometer may be positioned in the bridge or nose piece of the glasses. In some embodiments, other facial vibrations may additionally or alternatively be detected with one or more additional accelerometers or other vibration sensors (e.g., a hat, cap, or headband form factor wearable device may position an accelerometer against the speaker's forehead). The wearable device 56 may also include a BLUETOOTH, a WIFI, and/or a cellular radio and antenna to communicate the sensor information to another computing device (e.g., a user device, a server, the cloud, etc.) to perform the speaker recognition as described herein. For example, the wearable device may communicate the sensor information to a user device (e.g., a smartphone carried by the speaker 55) to perform the speaker recognition as described herein, or the user device may further communicate the sensor information to another computing device (e.g., a server or the cloud) to perform the speaker recognition as described herein.

Advantageously, some embodiments utilization of nasal vibration signals acquired by accelerometer may overcome one or more problems with speaker recognition technology which utilizes only audio-based technology. In particular, the vibration information combined with the audio information may provide improved accuracy. For example, when the accelerometer signal is combined with the microphone signal some embodiments may improve the overall robustness over the baseline. In some embodiments, the microphone and accelerometer signals may advantageously provide highly complementary characteristics for the task of speaker recognition. Some embodiments may also advantageously provide resistance against replay attacks. For example, the vibration sensor may detect the speech by contact with the person who is speaking. Accordingly, replay through the air may not be able to attack the system. Some embodiments may also advantageously improve noise robustness. For example, speech acquired through a vibration sensor may pick up much less ambient noise than a microphone.

Figure 6A:
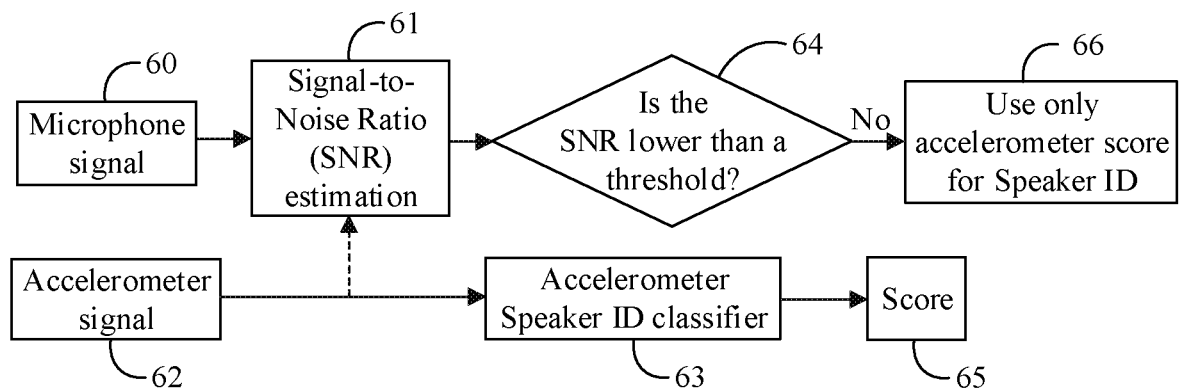
FIGS. 6A to 6B are process flow diagrams of an example of vibration-based speaker recognition according to an embodiment.
Figure 6B:
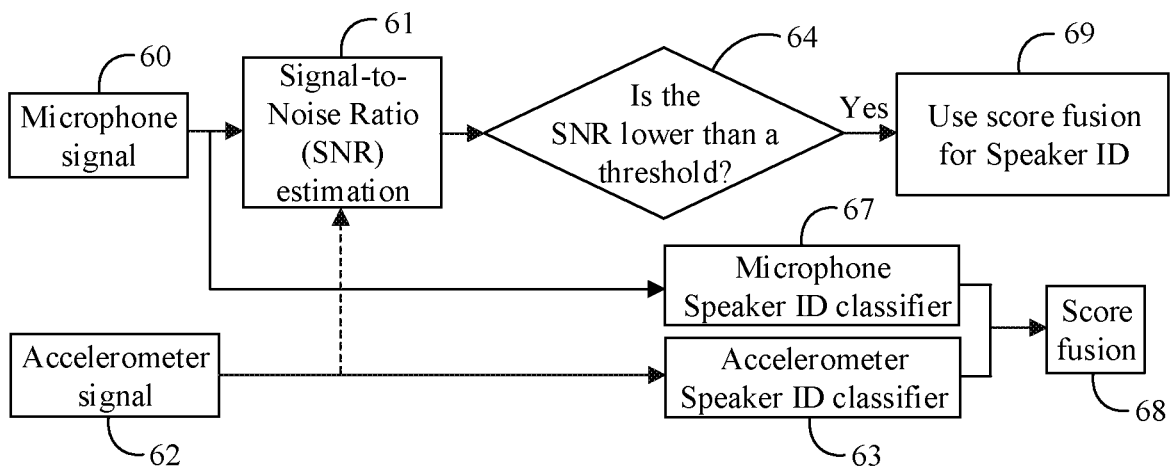

Turning now to FIGS. 6A to 6B, an embodiment of a speaker recognition process flow 59 may include providing a microphone signal 60 to a signal-to-noise ratio (SNR) estimation module 61 in parallel with providing an accelerometer signal 62 to an accelerometer speaker ID classifier 63. In some embodiments, the accelerometer signal 62 may also be provided to the SNR estimation module 61 to help discriminate which moments of the microphone signal 60 may correspond to the user's voice and which may correspond just to background noise. The result of the SNR may be compared to a threshold at block 64. In a noisy environment, the SNR may not be lower than the threshold and a score 65 corresponding only to the accelerometer speaker ID classifier 63 may be used for the speaker ID at block 66 (e.g., see FIG. 6A). In a low noise environment, the SNR may be lower than the threshold and the microphone signal 60 may be provided to a microphone speaker ID classifier 67. The scores from both the microphone speaker ID classifier 67 and the accelerometer speaker ID classifier 63 may be combined to provide a score fusion 68, and the score fusion 68 may be used for the speaker ID at block 69 (see FIG. 6B).

Any suitable speaker recognition technology may be utilized for the microphone speaker ID classifier 67 and the accelerometer speaker ID classifier. Non-limiting examples of suitable speaker recognition (SR) technology include Mel Frequency Cepstral Coefficients (MFCCs) front-end technology together with a machine-learning classifier on the back-end. The classifier in the back-end may include Gaussian mixture model (GMM) technology, GMM using universal background model (GMM-UBM) technology, GMM-UBM, GMM using support vector machine (GMM-SVM) technology, i-vector/probabilistic linear discriminant analysis (PLDA) technology, etc. For a short-duration task such as speaker identification, GMM-SVM technology may be preferred.

The output of the SR may be a score indicating a likelihood of a match to an enrolled speaker. The decision to accept or reject the score may be determined by a threshold, which may be a tradeoff between a false reject rate (FRR) versus a false accept rate (FAR). If the threshold is selected such that FRR=FAR, the resulting error rate may be referred to as the equal error rate (EER). Some embodiments may advantageously provide a lower EER as compared to some other systems utilizing only audio-based speaker recognition technology. Some embodiments may average the scores of the two SR models, advantageously providing improved EER (e.g., indicating that the microphone and accelerometer sensors may be highly complementary to the task of speaker identification). In noisy environments, the accelerometer-based EER may be consistently lower than the microphone-based EER. Accordingly, some embodiments may utilize only the accelerometer-based score in noisy environments, or may utilize a weighted average based on the level of background noise.

Figure 7:
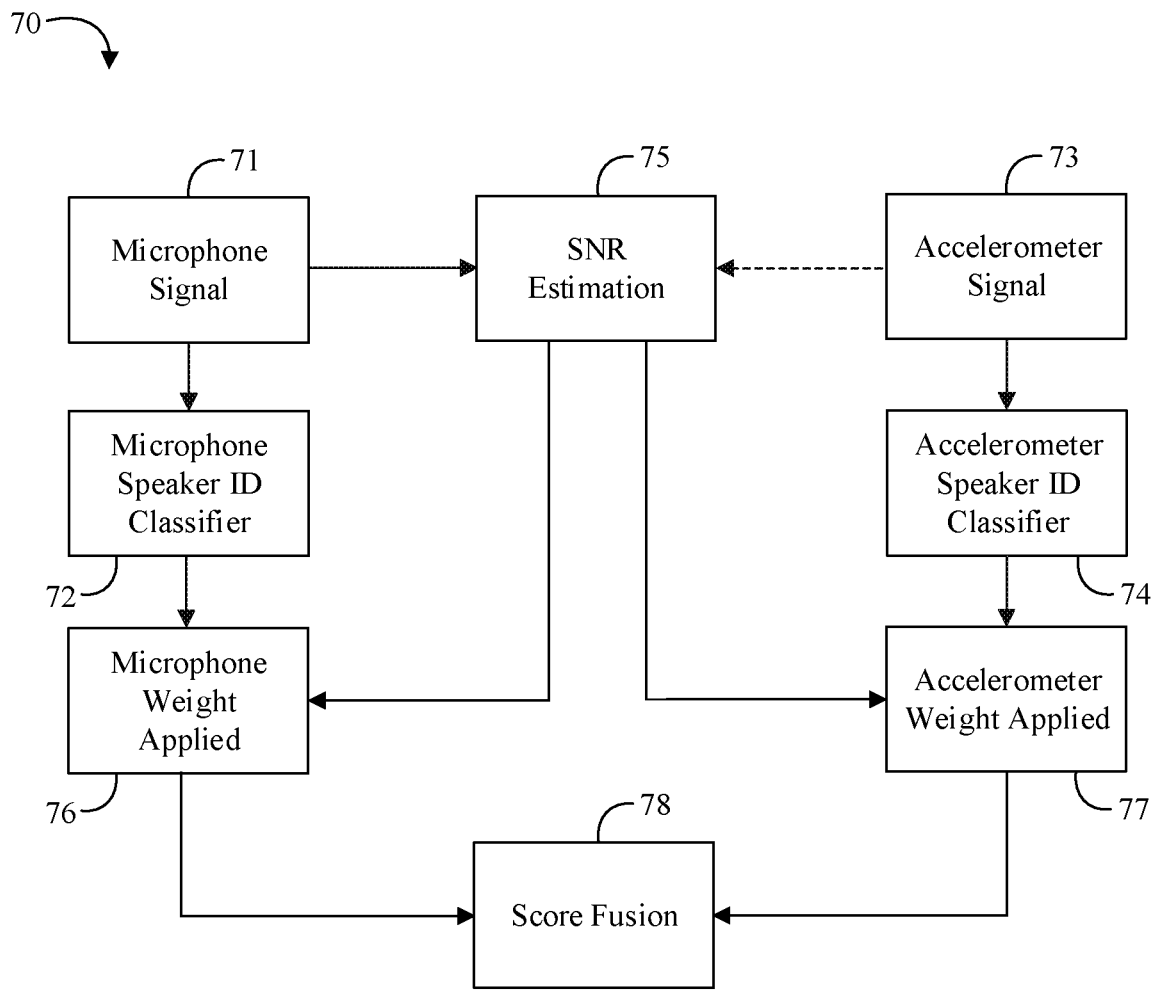
FIG. 7 is a process flow diagram of another example of vibration-based speaker recognition according to an embodiment.

Turning now to FIG. 7, an embodiment of a speaker recognition process flow 70 may include providing a microphone signal 71 to a microphone speaker ID classifier 72 in parallel with providing an accelerometer signal 73 to an accelerometer speaker ID classifier 74. The microphone signal 71 may also be provided to a SNR estimation module 75. In some embodiments, the accelerometer signal 73 may also be provided to the SNR estimation module 75 to help discriminate which moments of the microphone signal 71 may correspond to the user's voice and which may correspond just to background noise. An appropriate weight may be applied to the score of the microphone speaker ID classifier 72 at block 76 based on the SNR estimation 75, and a respective weight may also be applied to the score of the accelerometer speaker ID classifier 74 at block 77 based on the SNR estimation 75. The weighted scores may be combined (e.g., a weighted average may be determined) to provide a score fusion 78. For example, in a low noise environment the two scores may be equally weighted while in a noisy environment the score of the microphone speaker ID classifier 72 may receive no weight such that only the score of the accelerometer speaker ID classifier 74 may be used for the score fusion 78.

Figure 8:
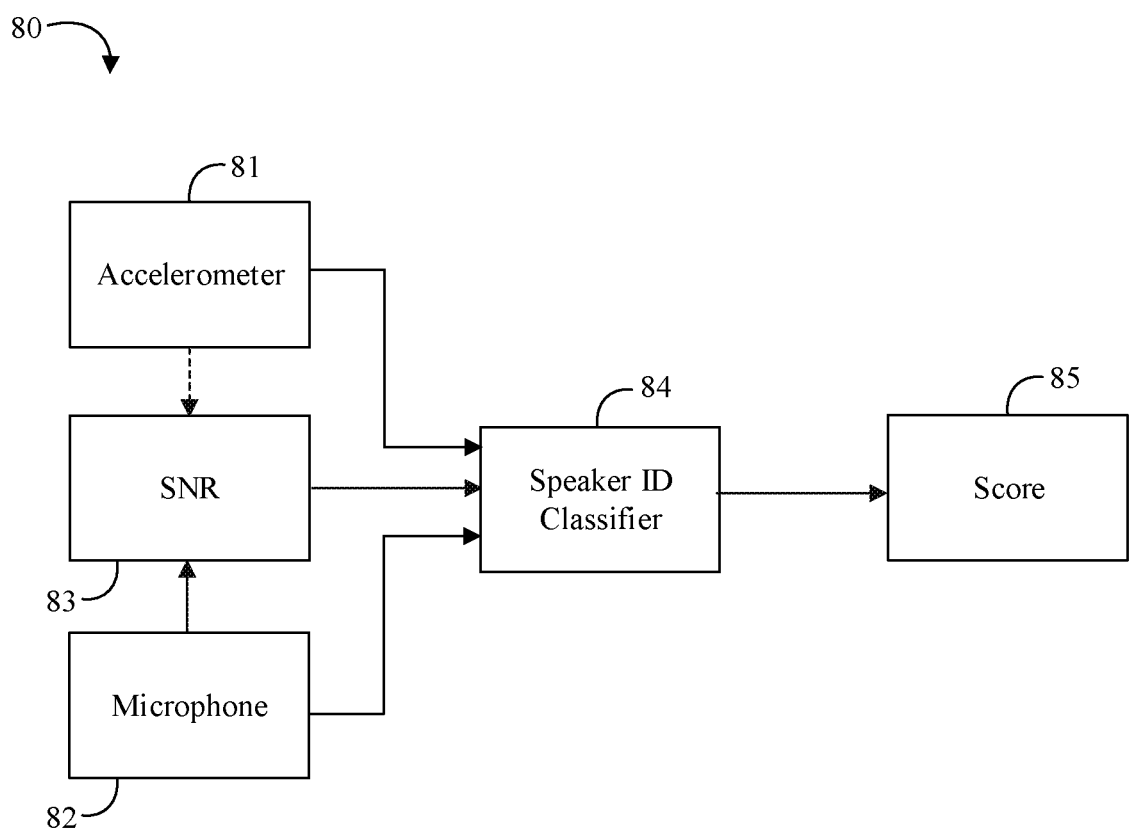
FIG. 8 is a process flow diagram of another example of vibration-based speaker recognition according to an embodiment.

Turning now to FIG. 8, an embodiment of a speaker recognition process flow 80 may include providing accelerometer data 81, microphone data 82, and SNR data 83 to a multi-modal speaker ID classifier 84 to produce a speaker ID score 85. With suitable training, the multi-modal speaker ID classifier 84 may produce accurate results for a wide variety of noise environments. Some embodiments may advantageously provide lower EER in all conditions, may be robust to resisting replay attacks, and/or may provide speaker recognition in various wearable devices form factors (e.g., including glasses).

Figure 9:
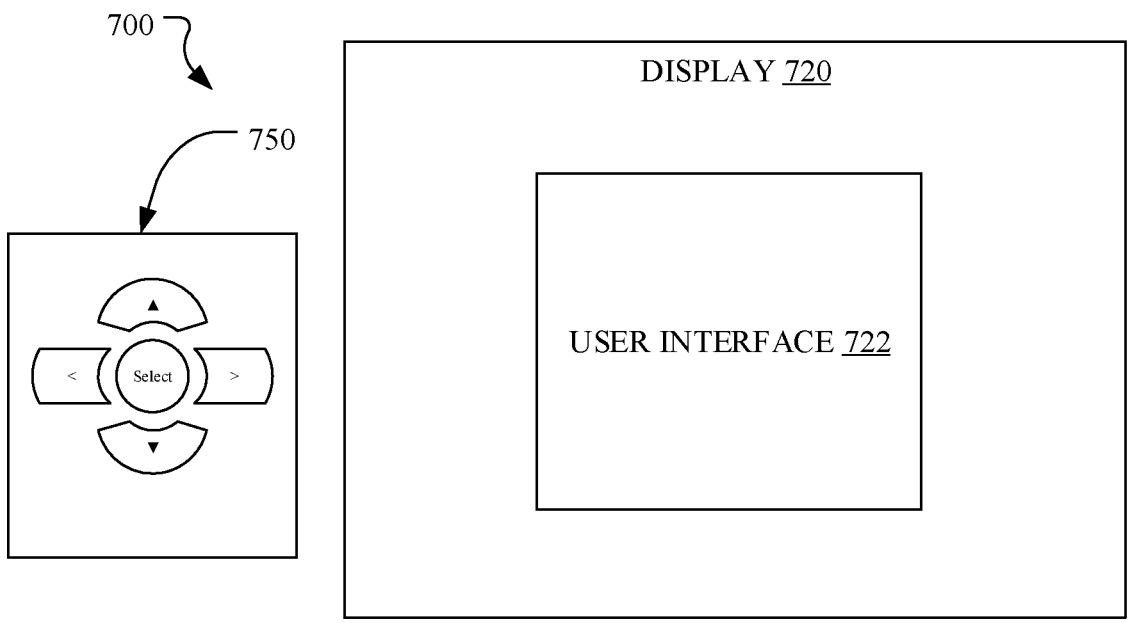
FIG. 9 is a block diagram of an example of a system having a navigation controller according to an embodiment.
Figure 9:
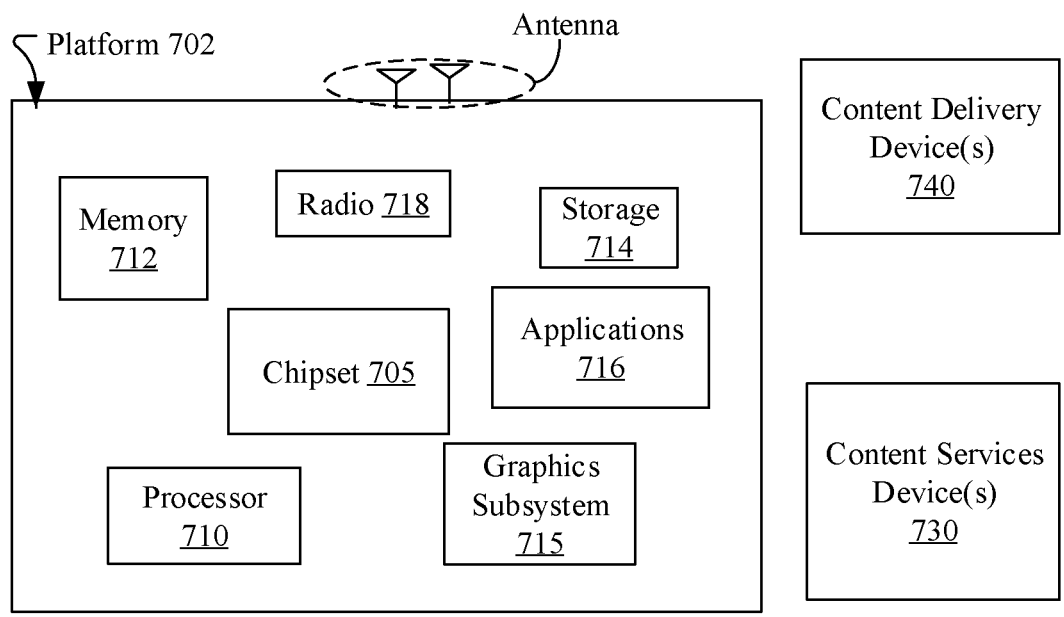
Figure 9:
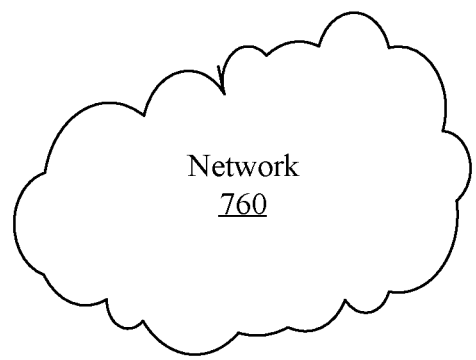

FIG. 9 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
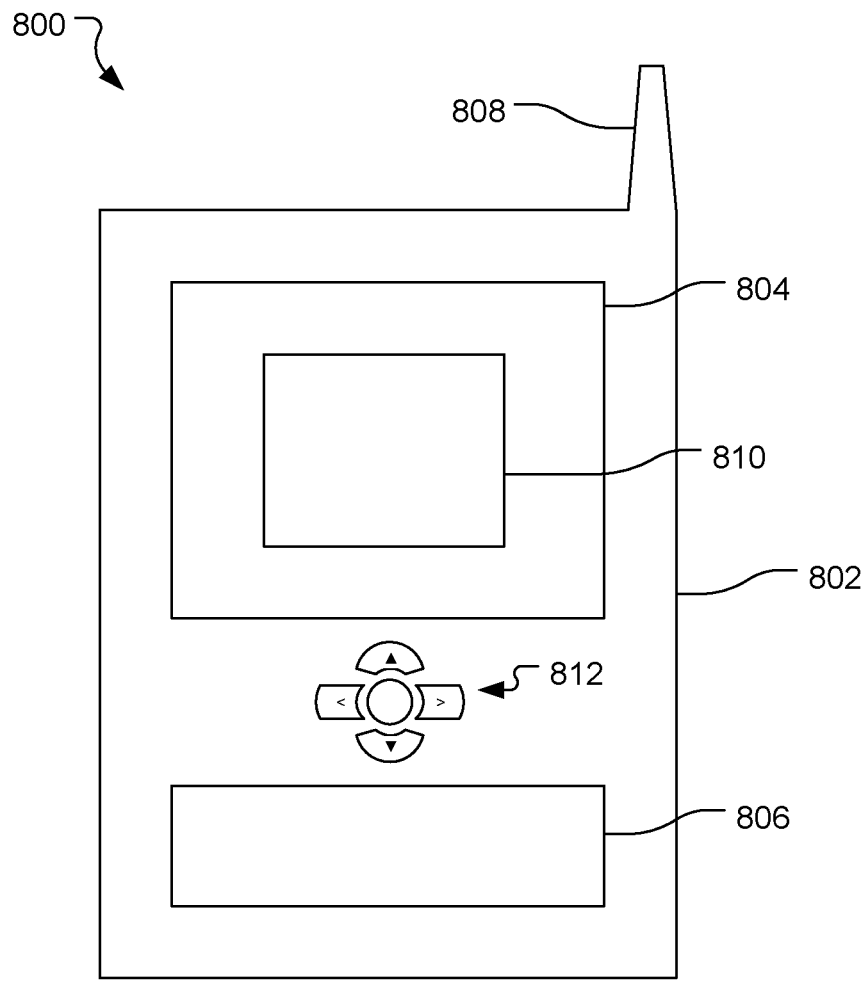
FIG. 10 is a block diagram of an example of a system having a small form factor according to an embodiment.

As described above, the system 700 may be embodied in varying physical styles or form factors. FIG. 10 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

Some embodiments of the system 700 and/or the device 800 may include aspects or features of the embodiments described herein, including one or more aspects of the following Examples.

Additional Notes and Examples

Example 1 may include an electronic processing system, comprising a processor, memory communicatively coupled to the processor, and logic communicatively coupled to the processor to acquire vibration information corresponding to a speaker, and identify the speaker based on the vibration information.

Example 2 may include the system of Example 1, wherein the logic is further to acquire audio information corresponding to the speaker, and identify the speaker based on both the audio information and the vibration information.

Example 3 may include the system of Example 2, wherein the logic is further to perform speaker recognition based on the audio information to determine a first recognition score, perform speaker recognition based on the vibration information to determine a second recognition score, and identify the speaker based on an average of the first recognition score and the second recognition score.

Example 4 may include the system of Example 3, wherein the logic is further to determine a level of background noise, compare the level of background noise against a threshold, identify the speaker based on both the audio information and the vibration information if the level of background noise is less than the threshold, and identify the speaker based on only the vibration information if the level of background noise is greater than or equal to the threshold.

Example 5 may include the system of Example 3, wherein the logic is further to determine a level of background noise, apply weights to the first and second recognition scores based on the level of background noise, and identify the speaker based on an average of the weighted first recognition score and the weighted second recognition score.

Example 6 may include the system of any of Examples 2 to 5, wherein the logic is further to acquire the audio information from a microphone, and acquire vibration information from an accelerometer.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to acquire vibration information corresponding to a speaker, and identify the speaker based on the vibration information.

Example 8 may include the apparatus of Example 7, wherein the logic is further to acquire audio information corresponding to the speaker, and identify the speaker based on both the audio information and the vibration information.

Example 9 may include the apparatus of Example 8, wherein the logic is further to perform speaker recognition based on the audio information to determine a first recognition score, perform speaker recognition based on the vibration information to determine a second recognition score, and identify the speaker based on an average of the first recognition score and the second recognition score.

Example 10 may include the apparatus of Example 9, wherein the logic is further to determine a level of background noise, compare the level of background noise against a threshold, identify the speaker based on both the audio information and the vibration information if the level of background noise is less than the threshold, and identify the speaker based on only the vibration information if the level of background noise is greater than or equal to the threshold.

Example 11 may include the apparatus of Example 9, wherein the logic is further to determine a level of background noise, apply weights to the first and second recognition scores based on the level of background noise, and identify the speaker based on an average of the weighted first recognition score and the weighted second recognition score.

Example 12 may include the apparatus of any of Examples 8 to 11, wherein the logic is further to acquire the audio information from a microphone, and acquire vibration information from an accelerometer.

Example 13 may include the semiconductor package apparatus of Example 7, wherein the logic coupled to the one or more substrates includes transistor channel regions that are positioned within the one or more substrates.

Example 14 may include a method of identifying a speaker, comprising acquiring vibration information corresponding to a speaker, and identifying the speaker based on the vibration information.

Example 15 may include the method of Example 14, further comprising acquiring audio information corresponding to the speaker, identifying the speaker based on both the audio information and the vibration information.

Example 16 may include the method of Example 15, further comprising performing speaker recognition based on the audio information to determine a first recognition score, performing speaker recognition based on the vibration information to determine a second recognition score, and identifying the speaker based on an average of the first recognition score and the second recognition score.

Example 17 may include the method of Example 16, further comprising determining a level of background noise, comparing the level of background noise against a threshold, identifying the speaker based on both the audio information and the vibration information if the level of background noise is less than the threshold, and identifying the speaker based on only the vibration information if the level of background noise is greater than or equal to the threshold.

Example 18 may include the method of Example 16, further comprising determining a level of background noise, applying weights to the first and second recognition scores based on the level of background noise, and identifying the speaker based on an average of the weighted first recognition score and the weighted second recognition score.

Example 19 may include the method of any of Examples 15 to 18, further comprising acquiring the audio information from a microphone, and acquiring vibration information from an accelerometer.

Example 20 may include at least one computer readable medium, comprising a set of instructions, which when executed by a computing device, can cause the computing device to acquire vibration information corresponding to a speaker, and identify the speaker based on the vibration information.

Example 21 may include the at least one computer readable medium of Example 20, comprising a further set of instructions, which when executed by the computing device, can cause the computing device to acquire audio information corresponding to the speaker, and identify the speaker based on both the audio information and the vibration information.

Example 22 may include the at least one computer readable medium of Example 21, comprising a further set of instructions, which when executed by the computing device, cause the computing device to perform speaker recognition based on the audio information to determine a first recognition score, perform speaker recognition based on the vibration information to determine a second recognition score, and identify the speaker based on an average of the first recognition score and the second recognition score.

Example 23 may include the at least one computer readable medium of Example 22, comprising a further set of instructions, which when executed by the computing device, cause the computing device to determine a level of background noise, compare the level of background noise against a threshold, identify the speaker based on both the audio information and the vibration information if the level of background noise is less than the threshold, and identify the speaker based on only the vibration information if the level of background noise is greater than or equal to the threshold.

Example 24 may include the at least one computer readable medium of Example 22, comprising a further set of instructions, which when executed by the computing device, cause the computing device to determine a level of background noise, apply weights to the first and second recognition scores based on the level of background noise, and identify the speaker based on an average of the weighted first recognition score and the weighted second recognition score.

Example 25 may include the at least one computer readable medium of any of Examples 21 to 24, comprising a further set of instructions, which when executed by the computing device, cause the computing device to acquire the audio information from a microphone, and acquire vibration information from an accelerometer.

Example 26 may include a speaker recognition apparatus, comprising means for acquiring vibration information corresponding to a speaker, and means for identifying the speaker based on the vibration information.

Example 27 may include the apparatus of Example 26, further comprising means for acquiring audio information corresponding to the speaker, means for identifying the speaker based on both the audio information and the vibration information.

Example 28 may include the apparatus of Example 27, further comprising means for performing speaker recognition based on the audio information to determine a first recognition score, means for performing speaker recognition based on the vibration information to determine a second recognition score, and means for identifying the speaker based on an average of the first recognition score and the second recognition score.

Example 29 may include the apparatus of Example 28, further comprising means for determining a level of background noise, means for comparing the level of background noise against a threshold, means for identifying the speaker based on both the audio information and the vibration information if the level of background noise is less than the threshold, and means for identifying the speaker based on only the vibration information if the level of background noise is greater than or equal to the threshold.

Example 30 may include the apparatus of Example 28, further comprising means for determining a level of background noise, means for applying weights to the first and second recognition scores based on the level of background noise, and means for identifying the speaker based on an average of the weighted first recognition score and the weighted second recognition score.

Example 31 may include the apparatus of any of Examples 27 to 30, further comprising means for acquiring the audio information from a microphone, and means for acquiring vibration information from an accelerometer.

Example 32 may include a wearable apparatus, comprising a wearable housing to be worn by a user, an accelerometer supported by the wearable housing, and a microphone supported by the wearable housing.

Example 33 may include the apparatus of Example 32, further comprising a communication module to communicate information related to one or more of the accelerometer and the microphone to a speaker recognition module.

Example 34 may include the apparatus of Example 33, wherein the communication module comprises a radio and an antenna for wireless communication.

Example 35 may include the apparatus of any of Examples 32 to 34, wherein the wearable housing comprises a form factor of eyeglasses, and wherein the accelerometer is positioned in one or more of a bridge of the eyeglasses and a nose piece of the eyeglasses.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system comprising:
   a processor;
   memory communicatively coupled to the processor; and
   logic communicatively coupled to the processor to:
   acquire vibration information corresponding to a speaker,
   acquire audio information corresponding to the speaker,
   perform speaker recognition based on the audio information to determine a first recognition score,
   perform speaker recognition based on the vibration information to determine a second recognition score, and
   identify the speaker based on an average of the first recognition score and the second recognition score.

2. The system of claim 1, wherein the logic is further to:
   determine a level of background noise;
   compare the level of background noise against a threshold;
   identify the speaker based on both the audio information and the vibration information if the level of background noise is less than the threshold; and
   identify the speaker based on only the vibration information if the level of background noise is greater than or equal to the threshold.

3. The system of claim 1, wherein the logic is further to:
   determine a level of background noise;
   apply weights to the first and second recognition scores based on the level of background noise; and
   identify the speaker based on an average of the weighted first recognition score and the weighted second recognition score.

4. The system of claim 1, wherein the logic is further to:
   acquire the audio information from a microphone;
   acquire the vibration information from an accelerometer; and
   identify the speaker based on both the audio information from the microphone and the vibration information from the accelerometer.

5. A semiconductor package apparatus comprising:
   one or more substrates; and
   logic coupled to the one or more substrates, wherein the logic is at least partly implemented in one or more of configurable logic and fixed-functionality hardware logic, the logic coupled to the one or more substrates to:
   acquire vibration information corresponding to a speaker,
   acquire audio information corresponding to the speaker,
   perform speaker recognition based on the audio information to determine a first recognition score,
   perform speaker recognition based on the vibration information to determine a second recognition score, and
   identify the speaker based on an average of the first recognition score and the second recognition score.

6. The apparatus of claim 5, wherein the logic is further to:
   determine a level of background noise;
   compare the level of background noise against a threshold;
   identify the speaker based on both the audio information and the vibration information if the level of background noise is less than the threshold; and
   identify the speaker based on only the vibration information if the level of background noise is greater than or equal to the threshold.

7. The apparatus of claim 5, wherein the logic is further to:
   determine a level of background noise;
   apply weights to the first and second recognition scores based on the level of background noise; and
   identify the speaker based on an average of the weighted first recognition score and the weighted second recognition score.

8. The apparatus of claim 5, wherein the logic is further to:
   acquire the audio information from a microphone;
   acquire vibration information from an accelerometer; and
   identify the speaker based on both the audio information from the microphone and the vibration information from the accelerometer.

9. The semiconductor package apparatus of claim 5, wherein the logic coupled to the one or more substrates includes transistor channel regions that are positioned within the one or more substrates.

10. A method of identifying a speaker comprising:
    acquiring vibration information corresponding to a speaker;
    acquiring audio information corresponding to the speaker;
    performing speaker recognition based on the audio information to determine a first recognition score;
    performing speaker recognition based on the vibration information to determine a second recognition score; and
    identifying the speaker based on an average of the first recognition score and the second recognition score.

11. The method of claim 10, further comprising:
    determining a level of background noise;
    comparing the level of background noise against a threshold;
    identifying the speaker based on both the audio information and the vibration information if the level of background noise is less than the threshold; and
    identifying the speaker based on only the vibration information if the level of background noise is greater than or equal to the threshold.

12. The method of claim 10, further comprising:
    determining a level of background noise;
    applying weights to the first and second recognition scores based on the level of background noise; and
    identifying the speaker based on an average of the weighted first recognition score and the weighted second recognition score.

13. The method of claim 10, further comprising:
    acquiring the audio information from a microphone;
    acquiring the vibration information from an accelerometer; and identifying the speaker based on both the audio information from the microphone and the vibration information from the accelerometer.

14. At least one non-transitory computer readable medium, comprising a set of instructions, which when executed by a computing device, cause the computing device to:
 acquire vibration information corresponding to a speaker;
 acquire audio information corresponding to the speaker;
 perform speaker recognition based on the audio information to determine a first recognition score;
 perform speaker recognition based on the vibration information to determine a second recognition score; and
 identify the speaker based on an average of the first recognition score and the second recognition score.

15. The at least one non-transitory computer readable medium of claim 14, comprising a further set of instructions, which when executed by the computing device, cause the computing device to:
 determine a level of background noise;
 compare the level of background noise against a threshold;
 identify the speaker based on both the audio information and the vibration information if the level of background noise is less than the threshold; and
 identify the speaker based on only the vibration information if the level of background noise is greater than or equal to the threshold.

16. The at least one non-transitory computer readable medium of claim 14, comprising a further set of instructions, which when executed by the computing device, cause the computing device to:
 determine a level of background noise;
 apply weights to the first and second recognition scores based on the level of background noise; and
 identify the speaker based on an average of the weighted first recognition score and the weighted second recognition score.

17. The at least one non-transitory computer readable medium of claim 14, comprising a further set of instructions, which when executed by the computing device, cause the computing device to:
 acquire the audio information from a microphone;
 acquire vibration information from an accelerometer; and
 identify the speaker based on both the audio information from the microphone and the vibration information from the accelerometer.

\* \* \* \* \*